(12) United States Patent
Yu et al.

(10) Patent No.: US 6,655,596 B2
(45) Date of Patent: Dec. 2, 2003

(54) SCANNING APPARATUS UTILIZING GRAVITY ACCELERATION FOR SCANNING

(75) Inventors: Yu-Ru Yu, Chu-Pei (TW); Kuo-Jeng Wang, Kaohsiung (TW)

(73) Assignee: Macronix International Co., Ltd., Hsin-Chu (TW)

(*) Notice: Subject to any disclaimer, the term of this patent is extended or adjusted under 35 U.S.C. 154(b) by 43 days.

(21) Appl. No.: 10/054,984

(22) Filed: Jan. 25, 2002

(65) Prior Publication Data

US 2003/0141369 A1 Jul. 31, 2003

(51) Int. Cl.$^7$ ................................................ G06K 7/10
(52) U.S. Cl. ............................ 235/462.14; 235/462.14; 235/475; 235/477
(58) Field of Search .......................... 235/462.14, 475, 235/477

(56) References Cited

U.S. PATENT DOCUMENTS 5,336,876 A * 8/1994 Martinez Taylor .......... 235/475
RE37,166 E * 5/2001 Rando et al. ............ 235/462.36
6,365,909 B1 * 4/2002 Hayakawa et al. .......... 250/584
6,445,836 B1 * 9/2002 Fujiwara .................... 382/312

* cited by examiner

Primary Examiner—Michael G. Lee
Assistant Examiner—Seung H Lee

(57) ABSTRACT

A scanning apparatus utilizing gravity acceleration for scanning is provided. The scanning apparatus comprises a U-shaped housing, a shaft bearing, a housing and a scanning head. The shaft bearing passes through the housing with two ends thereof respectively and rotationally fastened on two sidewalls of the U-shaped housing, thereby the housing is vertically and rotationally fastened in the U-shaped housing. The scanning head is disposed in the housing with an engageable piece engaged with a hook-shaped element of the housing so as to fasten the scanning head at a predetermined position close to the top end of the housing. When the scanning head is going to scan, the engagement between the engageable piece and the hook-shaped element is released and a starting power is applied to the scanning head by gravity acceleration. Thereby the scanning head is guided to move downward to scan via cooperation between a guiding piece and a guiding rail. The scanning speed of the scanning head is determined by the starting power controlled by a predetermined angle contained between the housing and the U-shaped housing.

21 Claims, 4 Drawing Sheets

SCANNING APPARATUS UTILIZING GRAVITY ACCELERATION FOR SCANNING

BACKGROUND OF THE INVENTION

1. Field of the Invention

The present invention relates to a scanning apparatus, and more particularly to a vertical scanning-type scanning apparatus.

2. Description of the Prior Art

Optical scanning devices, such as a flat bed scanner, is well known in the art and produces machine-readable image data signals that are representative of a scanned object, such as a photograph or a page of printed text. In a typical scanner application, the image data signals produced by a scanner may be used by a personal computer to reproduce an image of the scanned object on a suitable display device, such as a CRT or a printer.

Referring to FIG. 1, which is a schematically cross-sectional view of a prior flat bed scanner 100. A document 102 is positioned with one side facing downward on a transparent platen 104. The downward facing side of the document 102 is then scanned so as to convert the visual images contained thereon into an electronic image data that is useable by data processing machines and the like. A scanning head 106 horizontally moves under the transparent platen 104 for a scanning action. The scanning head 106 comprises a linear light source 108, a mirror assembly 110, a lens 114 and a photodetector 116. A motor 112 is mechanically coupled to the scanning head 106 by gears, cables or the like, to move the scanning head 106 along the length of the transparent platen 104. The light reflected from the transparent platen 104 is redirected into the lens 114 by the mirror assembly 110 and thence into the photodetector 116.

The photodetector 116 is preferably a charge coupled device (CCD) assembly configured as a linear serial array of discrete detector cells. Each detector cell of the photodetector 116 defines a document picture element or a pixel. The output scan signal from the photodetector 116 is coupled through a flexible cable 120 to an electronic controller 122 for conversion to digital forms. The electronic controller 122 also introduces drive signals to the motor 112. The electronic controller 122 incorporates the data processing and handling elements for exchanging data and signals with a remote processor in communication with the output cable 126.

The prior flat bed scanner 100 is placed with the transparent platen 104 in parallel with the placing surface. The scanning head 106 is moved along the length of the transparent platen 104 by the motor 112 driven by the electronic controller 122 to capture image data. Hence, the prior flat bed scanner 100 not only needs a larger occupied space but also a motor for moving the scanning head and a power source for driving the motor is also required.

Accordingly, an improved scanning apparatus, which can solve the above drawbacks, is desired, so that the occupied space can be reduced and the power source can be decreased.

SUMMARY OF THE INVENTION

It is one objective of the present invention to provide a scanning apparatus utilizing gravity acceleration for scanning, in which starting power is applied on a scanning head by gravity acceleration to downwardly move the scanning head for scanning.

It is another objective of the present invention to provide a scanning apparatus utilizing gravity acceleration for scanning, in which a scanning speed of a scanning head is determined by the starting power applied to the scanning head, which is controlled by a predetermined angle rotated by the scanning head.

It is a further objective of the present invention to provide a scanning apparatus utilizing gravity acceleration for scanning, which is a kind of a vertically scanning-type scanning apparatus which can reduce the occupied space.

It is still a further objective of the present invention to provide a scanning apparatus utilizing gravity acceleration for scanning, in which the starting power is applied to a scanning head by gravity acceleration. Therefore, a motor for driving the scanning head can be omitted, and the manufacturing costs can be reduced.

In order to achieve the above objectives of this invention, the present invention provides a scanning apparatus utilizing gravity acceleration for scanning. The scanning apparatus comprises a U-shaped housing, a shaft bearing, a housing and a scanning head. The U-shaped housing includes a base plate and two sidewalls. The shaft bearing is disposed within the U-shaped housing with two ends thereof respectively and rotationally fastened to one of the two sidewalls. The housing includes a transparent top plate, a transparent bottom plate, a hook-shaped element and a guiding rail. The shaft bearing passes through the housing in parallel with the transparent top plate and the transparent bottom plate such that the housing is rotationally fastened in the U-shaped housing. Both the transparent top plate and the transparent bottom plate serves as a scanning platform. The hook-shaped element is disposed between the transparent top plate and the transparent bottom plate close to a top corner of the housing. The guiding rail is vertically disposed in the housing opposite to the hook-shaped element. The scanning head is disposed downwardly moveable in the housing. The scanning head comprises a transparent housing, light source, mirror assembly, lens assembly and a photodetector. The transparent housing is provided with an engageable piece and a guiding piece. The engageable piece is disposed on the top end of the transparent housing to be engaged with the hook-shaped element for fastening the scanning head when the scanning head is placed on the top end of the housing. The guiding piece is disposed in the transparent housing opposite to the engageable piece and in cooperation with the guiding rail to guide the scanning head to move downward for scanning. The light source, mirror assembly, lens assembly and the photodetector are disposed within the transparent housing in a predetermined arrangement so as to capture image data while scanning. When the scanning head is going to scan, the engagement between the engageable piece and the hook-shaped element is released and the starting power is applied by gravity acceleration. Thereby the scanning head is guided to move downward to scan via cooperation between the guiding piece and the guiding rail. By way of rotating the shaft bearing to generate a predetermined angle between the housing and the base plate of the U-shaped housing to change the starting power, thereby changing a scanning speed of the scanning head.

BRIEF DESCRIPTION OF THE DRAWINGS

The objectives and features of the present invention as well as advantages thereof will become apparent from the following detailed description, considered in conjunction with the accompanying drawings. It is to be understood, however, that the drawings, which are not to scale, are designed for the purpose of illustration and not as a definition of the limits of the invention, for which reference should be made to the appended claims.

DESCRIPTION OF THE PREFERRED EMBODIMENTS

The present invention provides a vertical scanning-type scanning apparatus which, is placed in a way, that a scanning platform is vertical to the placing surface. A starting power is applied to the scanning head of the present scanning apparatus by gravity acceleration, thereby the scanning head is moved downwards. It is not necessary to use a motor device for moving the scanning head in the present invention. The scanning resolution of a scanning apparatus is inversely related to the product of the scanning speed of the scanning head and the exposure time of the light source. In the present invention, the starting power is varied as a predetermine angle contained between the scanning platform and the placing surface of the scanning apparatus is varied. As a result, a downward scanning speed of the scanning head is controlled by way of changing the predetermined angle to fulfill different scanning resolutions.

The present scanning apparatus utilizing gravity acceleration for scanning will be described in detail with reference to the following preferred embodiments.

Figure 1:
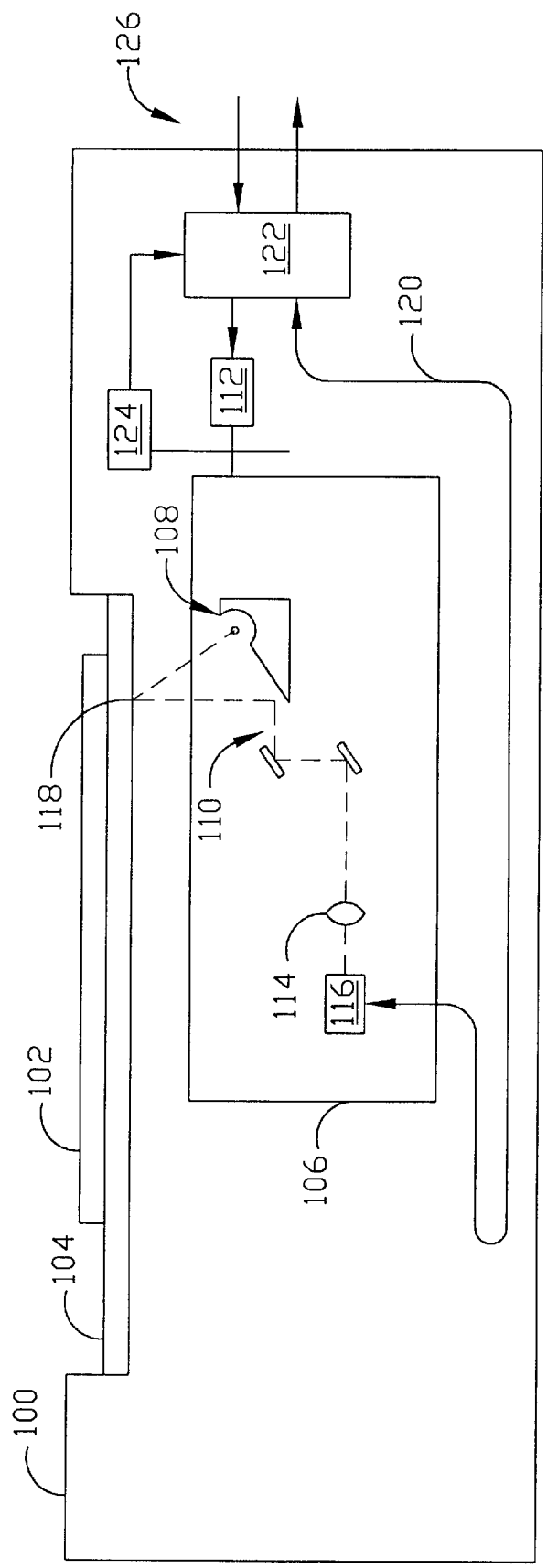
FIG. 1 is a schematically cross-sectional view of a prior flat bed scanner.
Figure 2:
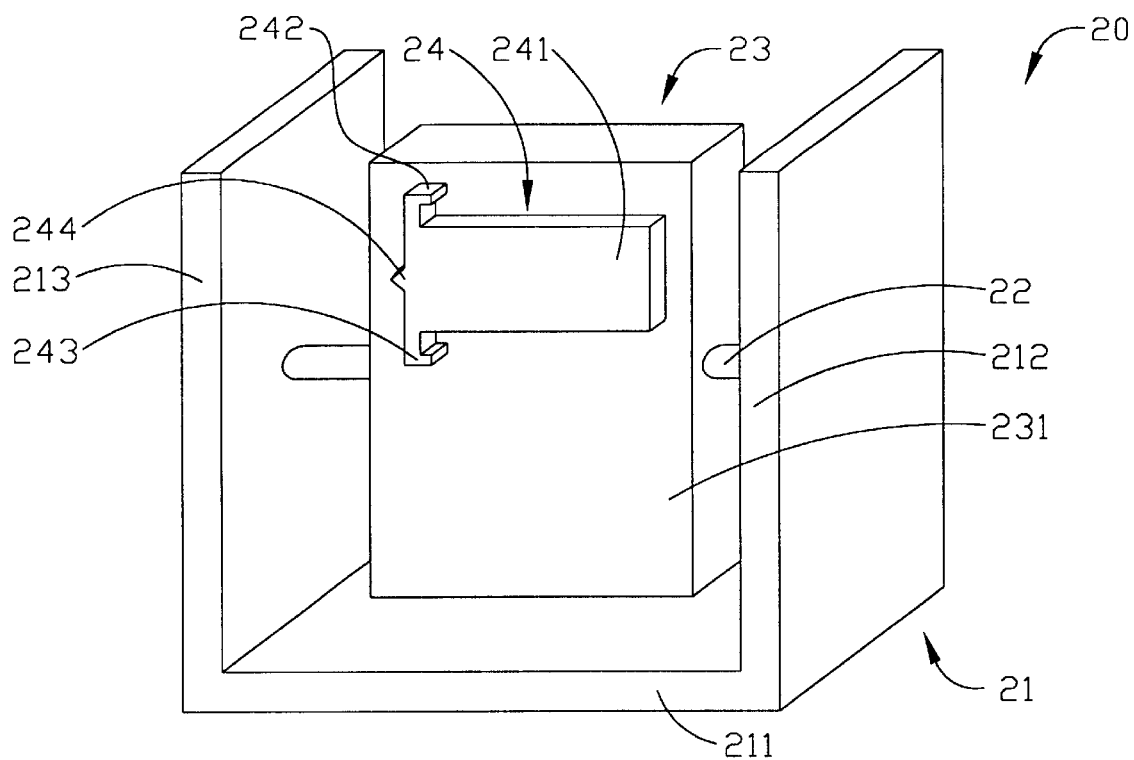
FIG. 2 is a schematically perspective view of a preferred embodiment of the present invention.

Referring to FIG. 2, which is a perspective view of a preferred embodiment of the present invention. The scanning apparatus 20 of the preferred embodiment comprises a U-shaped housing 21, a shaft bearing 22, a housing 23 and a scanning head 24. The U-shaped housing 21 includes a base plate 211 and two sidewalls 212, 213. The shaft bearing 22 is disposed in the U-shaped housing 21 with two ends thereof respectively and rotationally fastened to the two sidewalls 212, 213.

Figure 4:
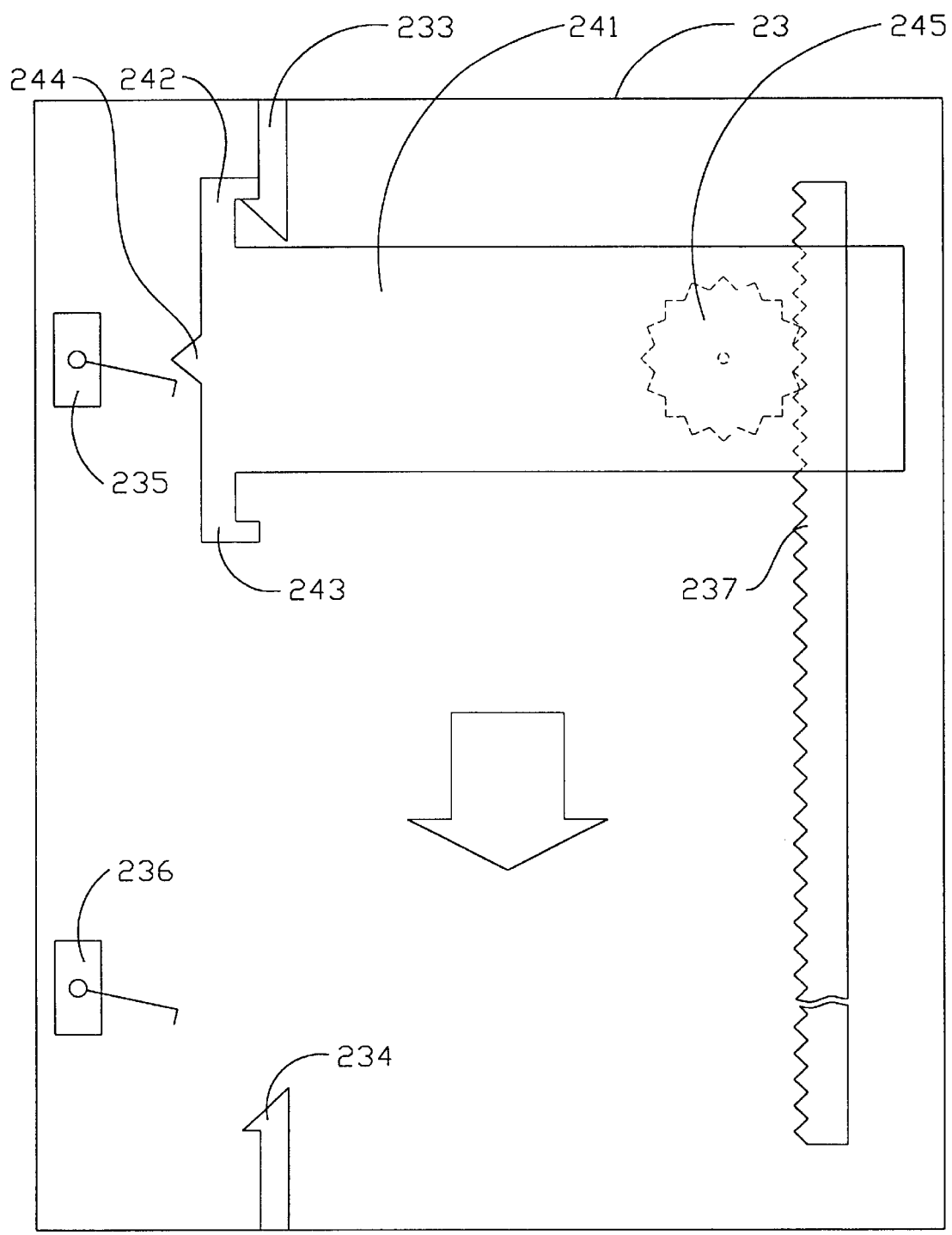
FIG. 4 is a schematically inner structural view of a housing of the preferred embodiment of FIG. 2.

Referring to FIG. 2 and FIG. 4, of which FIG. 4 shows a schematic inner structural view of the housing 23. The housing 23 includes a transparent top plate 231, a transparent bottom plate 232 (not shown), a first hook-shaped element 233, a second hook-shaped element 234, a first sensor piece 235, a second sensor piece 236 and a guiding rail 237. The shaft bearing 22 passes through the housing 23 in parallel with the transparent top plate 231 and the transparent bottom plate 232 such that the housing 23 is rotationally and vertically fastened in the U-shaped housing 21. The transparent top plate 231 and the transparent bottom plate 232 are respectively serve as a scanning platform. The materials of both are suitable for being attachable with a document to be scanned. Referring to FIG. 4, the first hook-shaped element 233 is disposed between the transparent top plate 231 and the transparent bottom plate 232 close to a top corner of the housing 23. The second hook-shaped element 234 is disposed between the transparent top plate 231 and the transparent bottom plate 232 close to a bottom corner of the housing 23 opposite to the top corner. The guiding rail 237 is vertically disposed in the housing 23 opposite to the first hook-shaped element 233 and the second hook-shaped element 234. The first sensor piece 235 is disposed at a first predetermined position in the housing 23 close to the first hook-shaped element 233. The second sensor piece 236 is disposed at a second predetermined position in the housing 23 close to the second hook-shaped element 234. Both the first sensor piece 235 and the second sensor piece 236 are disposed between the transparent top plate 231 and the transparent bottom plate 232 and on the same side of the housing 23.

Referring to FIG. 2 and FIG. 4 again, the scanning head 24 is downward moveable and vertically disposed in housing 23. The scanning head 24 includes a transparent housing 241, a light source (not shown), a mirror assembly (not shown), a lens assembly (not shown) and a photodetector (not shown). The transparent housing 241 includes a first engageable piece 242, a second engageable piece 243, a protrusion 244 and a guiding piece 245. The first engageable piece 242 is disposed at a top end of the transparent housing 241 for being engaged with the first hook-shaped element 233 to fasten the scanning head 24 when the scanning head 24 is placed at the top end of the housing 23. The second engageable piece 243 is disposed at the bottom end of the transparent housing 241. This is opposite of the top end to engage the second hook-shaped element 234 to fasten the scanning head 24 when the scanning head 24 is placed at a bottom end of the housing 23. Both of the first engageable piece 242 and the second engageable piece 243 can form an L-shaped protrusion. The guiding piece 245 is disposed in the transparent housing 241 opposite to the first engageable piece 242 and the second engageable piece 243. The protrusion 244 is formed at a predetermined position on the side of the transparent housing 241 having the first engageable piece 242 and the second engageable piece 243 formed thereon. The first engageable piece 242, the second engageable piece 243 and the protrusion 244 can be integrally formed with the transparent housing 241. The guiding piece 245 is cooperated with the guiding rail 237 to guide the scanning head 24 to downwards move for a scanning action. The guiding piece 245 can be a gear, and the guiding rail 237 has at least a tooth-edged side in cooperation with the gear. The light source, the mirror assembly, the lens assembly and the photodetector are disposed in a predetermined arrangement within the transparent housing 241 so as to capture image data when the scanning head 24 proceeds with scanning.

When the scanning head 24 is going to scan, a document is attached on the transparent top plate 231, with one side containing pictures/text facing downwards. The engagement between the first engageable piece 242 and the first hook-shaped element 233 is then released, and a starting power is applied to the scanning head 24 by gravity acceleration. Thereby the scanning head 24 is moved downwards via cooperation of the guiding piece 245 and the guiding rail 237. Once the engagement between the first engageable piece 242 and the first hook-shaped element 233 is released, the scanning head 24 moves downwards due to the starting power from gravity acceleration. When the protrusion 244 of the scanning head 24 passes through the first sensor piece 235, the first sensor piece 235 will detect the beginning of a scanning action of the scanning head 24. The scanning head 24 continues to move downwards, and after a period of distance the protrusion 244 passes through the second sensor piece 236. Thereby, the second sensor piece 236 detects the scanning head 24 getting the bottom end of the housing 23, and then the second engageable piece 243 is engaged with the second hook-shaped element 234 to fasten the scanning head 24 at the bottom end of the housing 23. When a next scan is to be proceeded, the housing 23 can be directly turned over 180 degrees to make the transparent bottom plate 232 placing on the top of the housing 23 to serve as a scanning platform. The document is attached on the transparent bottom plate 232. The engagement between the second engageable piece 243 and the second hook-shaped element 234 is then released such that the scanning head 24 moves downwards. Besides, the scanning head 24 can be moved upward to a predetermined initial position for scanning at the top end of the housing 23 by a first motor device (not shown).

Figure 5:
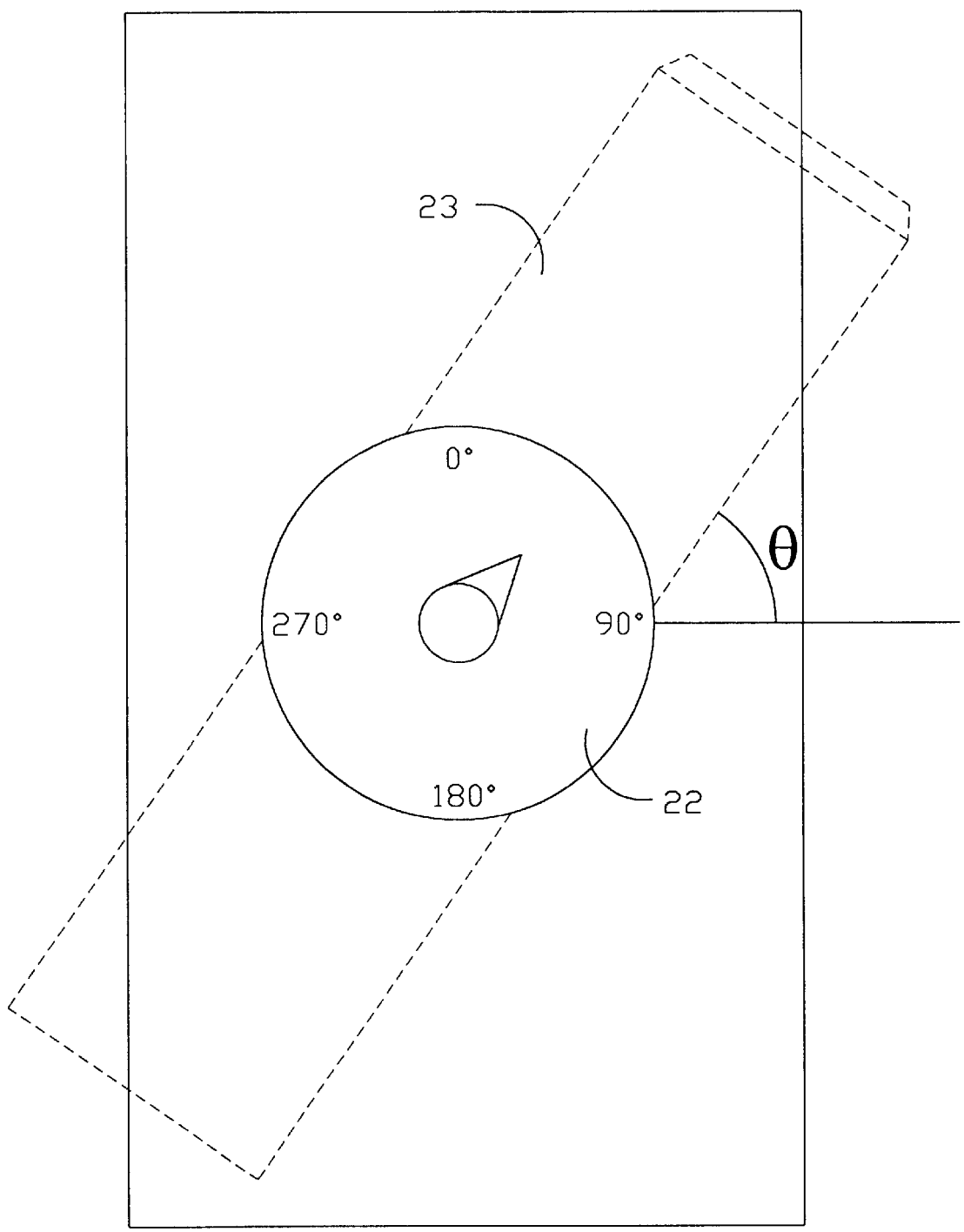
FIG. 5 is a schematic view showing that a predetermined angle rotated by the housing of the preferred embodiment of FIG. 2.

As described in the foregoing, the scanning resolution of a scanning apparatus is inversely related to the product of the scanning speed of the scanning head and the exposure time of a light source. As shown in FIG. 5, a predetermined angle contained between the housing 23 and the base plate 211 of the U-shaped housing 21 can be varied by turning an angle tuner (not shown) disposed at one end of the shaft bearing 22 such that the scanning head 24 can move downwards in different inclined angles related to the base plate 211 of the U-shaped housing 21. The starting power is applied on the scanning head 24 by gravity acceleration. Thus, the starting power is changed as the inclined angle of the scanning head 24 is changed. The different downward scanning speeds can be obtained by changing the predetermined angle contained between housing 23 and the base plate 211 of the U-shaped housing 21. Therefore, the requirement of different scanning resolution requires different scanning speed is fulfilled. On the other hand, the housing 23 can be rotated the predetermined angle by a second motor device (not shown) to determine the scanning speed.

Figure 3:
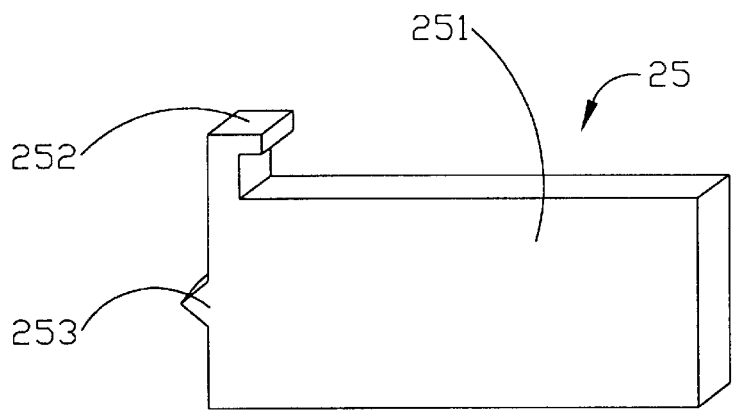
FIG. 3 is a schematically perspective view of a scanning head of another preferred embodiment of the present invention.

Referring to FIG. 3, which is a schematic perspective view of a scanning head 25 of another preferred embodiment. The transparent housing 251 of the scanning head 25 includes an engageable piece 252, a protrusion 253 and a guiding piece (not shown), it is the same with the guiding piece 245). The engageable piece 252 is disposed at a top end of the transparent housing 251 for engagement with the first hook-shaped element 233 to fasten the scanning head 25 when the scanning head 25 is placed at the top end of the housing 23. The protrusion 253 is formed at a predetermined position on the side of the transparent housing 251 having the engageable piece 252 formed thereon. The engageable piece 252 and the protrusion 253 can be integrally formed with the transparent housing 251. When the scanning head 25 is going to scan, a document is attached on the transparent top plate 231 with the side having pictures/text facing downwards. The engagement between the engageable piece 252 and the first hook-shaped element 233 is then released. A starting power is applied on the scanning head 25 by gravity acceleration, thereby the scanning head 25 moves downwards. When the protrusion 253 of the scanning head 25 passes through the first sensor piece 235, the first sensor piece 235 will detect beginning of a scanning action of the scanning head 25. The scanning head 25 continues to move downwards, and after a period of distance the protrusion 253 passes through the second sensor piece 236. Thereby, the second sensor piece 236 detects the scanning head 25 getting the bottom end of the housing 23. When a next scan is to be proceeded, the scanning head 25 can be moved upward to the predetermined initial position for scanning at the top end of the housing 23 by the first motor device (not shown).

What is claimed is:

1. A scanning apparatus utilizing gravity acceleration for scanning, comprising:
    a U-shaped housing having a base plate and two sidewalls;
    a shaft bearing disposed within said U-shaped housing with two ends thereof respectively and rotationally fastened to one of said two sidewalls;
    a housing having a transparent top plate, a transparent bottom plate, a hook-shaped element and a guiding rail, said shaft bearing passing through said housing in parallel with said transparent top plate and said transparent bottom plate such that said housing is rotationally fastened in said U-shaped housing, each of said transparent top plate and said transparent bottom plate serving as a scanning platform, said hook-shaped element disposed between said transparent top plate and said transparent bottom plate close to a top corner of said housing, and said guiding rail vertically disposed in said housing with opposite to said hook-shaped element; and
    a scanning head downward moveably disposed in said housing, said scanning head having a transparent housing, a light source, a mirror assembly, a lens assembly and a photodetector, said transparent housing having an engageable piece and a guiding piece, said engageable piece disposed in a top end of said transparent housing to be engaged with said hook-shaped element for fastening said scanning head when said scanning head is placed in a top end of said housing, said guiding piece disposed in said transparent housing with opposite to said engageable piece and cooperated with said guiding rail for guiding said scanning head to downwardly move for scanning, said light source, said mirror assembly, said lens assembly and said photodetector disposed within said transparent housing in a predetermined arrangement so as to capture image data during scanning;
    wherein, when said scanning head is going to scan, the engagement between said engageable piece and said hook-shaped element is released and a starting power is applied on said scanning head by a gravity acceleration, thereby said scanning head is guided to move downwardly to scan via cooperation between said guiding piece and said guiding rail, and by way of rotating said shaft bearing a predetermined angle to generate a predetermined angle contained between said housing and said base plate of said U-shaped housing to change said starting power, thereby changing a scanning speed of said scanning head.

2. The scanning apparatus of claim 1, wherein said engageable piece is formed of a L-shaped protrusion.

3. The scanning apparatus of claim 1, wherein a sensor piece is disposed in a predetermined position in said housing close to said hook-shaped element.

4. The scanning apparatus of claim 3, wherein said transparent housing of said scanning head is formed with a protrusion on the side with said engageable piece formed thereon such that said protrusion is detected by said sensor piece when said scanning head passing through.

5. The scanning apparatus of claim 1, wherein an angle tuner is disposed in one said end of said shaft bearing for tuning said predetermined angle of said shaft bearing.

6. The scanning apparatus of claim 1, wherein said guiding piece of said scanning head comprises a gear.

7. The scanning apparatus of claim 6, wherein the side of said guiding rail corresponding to said gear is formed with a tooth-edged side to be engaged with said gear.

8. The scanning apparatus of claim 1, wherein said scanning head is moved to said top end of said housing via a first motor device.

9. The scanning apparatus of claim 1, wherein said shaft bearing is rotated with a predetermined angle via a second motor device.

10. The scanning apparatus of claim 1, wherein each of said transparent top plate and said transparent bottom plate is attachable with a document to be scanned.

11. A scanning apparatus utilizing gravity acceleration for scanning, comprising:

a U-shaped housing having a base plate and two sidewalls;

a shaft bearing disposed within said U-shaped housing with two ends thereof respectively and rotationally fastened to one of said two sidewalls;

a housing having a transparent top plate, a transparent bottom plate, a first hook-shaped element, a second hook-shaped element and a guiding rail, said shaft bearing passing through said housing in parallel with said transparent top plate and said transparent bottom plate such that said housing is rotationally fastened in said U-shaped housing, each of said transparent top plate and said transparent bottom plate serving as a scanning platform, said first hook-shaped element disposed between said transparent top plate and said transparent bottom plate close to a top corner of said housing, said second hook-shaped element disposed in said housing close to a bottom corner of said housing opposite to said top corner, and said guiding rail vertically disposed in said housing with opposite to said first hook-shaped element and said second hook-shaped element; and a scanning head downward moveably disposed in said housing, said scanning head having a transparent housing, a light source, a mirror assembly, a lens assembly and a photodetector, said transparent housing having a first engageable piece, a second engageable piece and a guiding piece, said first engageable piece disposed in a top end of said transparent housing to be engaged with said first hook-shaped element for fastening said scanning head when said scanning head is placed in a top end of said housing, said second engageable piece disposed in a bottom end of said transparent housing opposite to said top end to be engaged with said second hook-shaped element for fastening said scanning head when said scanning head is placed in a bottom end of said housing, said guiding piece disposed in said transparent housing with opposite to said first engageable piece and said second engageable piece and cooperated with said guiding rail for guiding said scanning head to downwardly move for scanning, said light source, said mirror assembly, said lens assembly and said photodetector disposed within said transparent housing in a predetermined arrangement so as to capture image data during scanning;

wherein, when said scanning head is going to scan, the engagement between said first engageable piece and said first hook-shaped element is released and a starting power is applied on said scanning head by a gravity acceleration, thereby said scanning head is guided to move downwardly to scan via cooperation between said guiding piece and said guiding rail until said bottom end of said housing, then said second engageable piece is engaged with said second hook-shaped element to fasten said scanning head, and by way of rotating said shaft bearing a predetermined angle to generate a predetermined angle contained between said housing and said base plate of said U-shaped housing to change said starting power, thereby changing a scanning speed of said scanning head.

12. The scanning apparatus of claim 11, wherein said first engageable piece is formed of a first L-shaped protrusion.

13. The scanning apparatus of claim 11, wherein said second engageable piece is formed of a second L-shaped protrusion.

14. The scanning apparatus of claim 11, wherein a first sensor piece and a second sensor piece are disposed in said housing, said first sensor piece disposed in a first predetermined position close to said first hook-shaped element, said second sensor piece disposed in a second predetermined position close to said second hook-shaped element, and said first sensor element and said second sensor element disposed between said transparent top plate and said transparent bottom plate and in the same side of said housing.

15. The scanning apparatus of claim 14, wherein said transparent housing of said scanning head is formed with a protrusion on the side with said first engageable piece and said second engageable piece formed thereon such that said protrusion is detected by said first sensor piece when said scanning head passes through said first sensor piece and said protrusion is detected by said second sensor piece when said scanning head passes through said second sensor piece.

16. The scanning apparatus of claim 11, wherein an angle tuner is disposed in one said end of said shaft bearing for tuning said predetermined angle of said shaft bearing.

17. The scanning apparatus of claim 11, wherein said guiding piece of said scanning head comprises a gear.

18. The scanning apparatus of claim 17, wherein the side of said guiding rail corresponding to said gear is formed with a tooth-edged side to be engaged with said gear.

19. The scanning apparatus of claim 11, wherein said scanning head is moved to said top end of said housing via a first motor device.

20. The scanning apparatus of claim 11, wherein said shaft bearing is rotated with a predetermined angle via a second motor device.

21. The scanning apparatus of claim 11, wherein each of said transparent top plate and said transparent bottom plate is attachable with a document to be scanned.

* * * * *

UNITED STATES PATENT AND TRADEMARK OFFICE
CERTIFICATE OF CORRECTION

PATENT NO. : 6,655,596 B2
DATED : December 2, 2003
INVENTOR(S) : Yu-Ru Yu et al.

It is certified that error appears in the above-identified patent and that said Letters Patent is hereby corrected as shown below:

<u>Title page,</u>
Item [73], Assignee, change "Macronix International Co., Ltd." to -- UMAX DATA SYSTEMS INC. --

Signed and Sealed this

Ninth Day of August, 2005

JON W. DUDAS
*Director of the United States Patent and Trademark Office*